United States Patent
Furtwangler et al.

(10) Patent No.: US 10,228,828 B2
(45) Date of Patent: Mar. 12, 2019

(54) COORDINATING USER INTERFACE ELEMENTS ACROSS SCREEN SPACES

(71) Applicant: Home Box Office, Inc., New York, NY (US)

(72) Inventors: Brandon C. Furtwangler, Woodinville, WA (US); Aaron J. Nonis, Duvall, WA (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

(21) Appl. No.: 15/856,386

(22) Filed: Dec. 28, 2017

(65) Prior Publication Data

US 2018/0136807 A1    May 17, 2018

Related U.S. Application Data

(63) Continuation of application No. 13/965,081, filed on Aug. 12, 2013, now Pat. No. 9,864,490.

(51) Int. Cl.
*G06F 3/0484* (2013.01)
*G06F 9/451* (2018.01)
*G06F 3/14* (2006.01)

(52) U.S. Cl.
CPC ............ *G06F 3/0484* (2013.01); *G06F 9/451* (2018.02); *G06F 3/1423* (2013.01)

(58) Field of Classification Search
CPC ....... G06F 3/0484; G06F 9/451; G06F 3/1423
USPC ......................................................... 345/501
See application file for complete search history.

(56) References Cited

U.S. PATENT DOCUMENTS

| 9,864,990 | B2 | 1/2018 | Furtwangler et al. |
| 2002/0008703 | A1 | 1/2002 | Merrill et al. |
| 2004/0073472 | A1* | 4/2004 | Sakuma ................. G06Q 10/06 705/7.22 |
| 2006/0277498 | A1 | 12/2006 | Mann et al. |
| 2007/0188502 | A1 | 8/2007 | Bishop |
| 2008/0094513 | A1 | 4/2008 | Lee et al. |
| 2008/0303826 | A1 | 12/2008 | Schiff |

(Continued)

FOREIGN PATENT DOCUMENTS

WO    2014178748 A1    11/2014

OTHER PUBLICATIONS

"International Search Report", dated Nov. 25, 2014 Application No. PCT/US14/50598 pp. 1-8.
Office Action from U.S. Appl. No. 13/965,081, dated Mar. 20, 2015, 67 pages.
Office Action from U.S. Appl. No. 13/965,081, dated Oct. 16, 2015, 38 pages.

(Continued)

*Primary Examiner* — Ke Xiao
*Assistant Examiner* — Kim Thanh T Tran
(74) *Attorney, Agent, or Firm* — Amin, Turocy & Watson, LLP (57) ABSTRACT

The subject disclosure is directed towards transitioning from an existing screen (e.g., a page or the like) to a new screen, in which element(s)/control(s) of the existing screen are shared to the new screen. An existing screen acts as a source screen to provide element-related data (e.g., names) of its existing elements; the existing elements are intersected with those desired by the new/destination screen. The destination screen takes over ownership of any common elements. A navigation service may coordinate the exchange of information and the transition. The transition may include animations and/or other effects to provide a visually smooth transition or the like between screens.

20 Claims, 11 Drawing Sheets

(56) References Cited

U.S. PATENT DOCUMENTS

| | | |
|---|---|---|
| 2009/0172533 A1* | 7/2009 | Hamzaoui ............ G06F 9/4446 |
| | | 715/704 |
| 2009/0222489 A1 | 9/2009 | Sudoh et al. |
| 2009/0326687 A1 | 12/2009 | McCoy |
| 2010/0131858 A1 | 5/2010 | Schultz et al. |
| 2010/0235769 A1 | 9/2010 | Young |
| 2011/0126106 A1 | 5/2011 | Ben Shaul et al. |
| 2011/0185295 A1* | 7/2011 | Kashida ................ G06F 9/542 |
| | | 715/762 |
| 2011/0258534 A1 | 10/2011 | Young |
| 2013/0076764 A1* | 3/2013 | Yada ..................... G06F 3/1454 |
| | | 345/520 |
| 2013/0147825 A1 | 6/2013 | Martin et al. |
| 2014/0325404 A1 | 10/2014 | Khromov et al. |
| 2015/0026636 A1 | 1/2015 | Kawano |

OTHER PUBLICATIONS

Office Action for U.S. Appl. No. 13/965,081, dated Mar. 21, 2016, 48 pages.
Colombian Office Action and general English translation for CO Application Serial No. 16-063.029 dated Mar. 30, 2016, 6 pages.
Office Action for U.S. Appl. No. 13/965,081, dated Nov. 15, 2016, 51 pages.
Office Action for U.S. Appl. No. 13/965,081, dated May 10, 2017, 64 pages.
Extended European Search Report for European Application Serial No. 14836566.1 dated Mar. 8, 2017, 8 pages.
Notice of Allowance for U.S. Appl. No. 13/965,081, dated Sep. 29, 2017, 68 pages.
Mexican Office Action for Mexican Application Serial No. MX/a/2016/001977 dated Jul. 4, 2018, 4 pages.

* cited by examiner

COORDINATING USER INTERFACE ELEMENTS ACROSS SCREEN SPACES

CROSS-REFERENCE TO RELATED APPLICATION

The present application is a continuation of copending U.S. patent application Ser. No. 13/965,081, filed on Aug. 12, 2013.

BACKGROUND

Graphical user interfaces (GUIs, or simply UIs) traditionally have been broken down into a taxonomy that includes windows/screens/pages/controls and so forth that are composed together, where there is a one-to-one correspondence between a UI element and the code/logic that controls it. In a typical user interface pattern, such as Model-View-Controller (MVC), Model-View-View-Model (MVVM), and so forth, a single view scopes its UI elements within a hierarchy of the view. The view owns and manages the lifespan of its UI elements.

In such patterns, when a current view switches to a new view there is an abrupt view change, as the current view ends the lifetime of its UI elements and the new view starts its UI elements. It would be desirable for application designs to provide smooth transitions and/or soft borders between such views or the like, yet do so without requiring complex programming or requiring views to be programmed with the details regarding other views.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more of various aspects of the subject matter described herein are directed towards exchanging element-related information between a plurality of screens, including transitioning from a source screen (e.g., existing/outgoing screen) to a destination screen (e.g., new/incoming screen). The transitioning includes using the element-related information at a destination screen to share one or more existing elements of a source screen.

In one or more aspects, a navigation service is configured to couple element-related information of one or more elements of a source screen to a destination screen that takes ownership of one or more elements used by the source screen. The navigation service coordinates a transition from the source screen to the destination screen.

One or more aspects are directed towards transitioning from a source screen to a destination screen, including coordinating the changing of ownership of at least one shared element of the source screen to the destination screen. The destination need not know in advance of the element(s) of the source screen (and/or vice-versa). At least one other element associated with the destination screen is created to produce the destination screen of at least one shared element and at least one created element.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards having UI elements (synonymous with "controls" herein) exist in a global and virtual space. In one aspect, any screen can share its elements with any other screen. Each screen's controller basically leases any of the global UI elements for use within its screen, but the screen's controller (ordinarily) does not retain sole ownership.

Instead of a view managing the entire lifespan of its UI elements, the controllers control UI element lifespan by coordinating UI lifespan responsibility via a controller management API or the like. Each screen/controller creates UI elements and provides these elements (e.g., all or most) to an overall application on demand, that is, at a time of a transition to a new screen.

In one implementation, a new, incoming screen referred to herein as a destination screen may retain any elements that were being used by the prior, outgoing screen. As one benefit, a seamless and/or smooth transition between screens is facilitated. For example, an outgoing screen may transition one or more non-retained elements out of view, while an incoming screen may transition (or keep as is) any common element retained from the previous screen and/or add any further needed elements to produce the new screen.

In one implementation, a navigation service coordinates sharing which elements the new (destination) screen wants with which elements the current (source) screen already has created and rendered. In addition to using any already created and rendered elements, the destination screen need not know anything in advance regarding the source screen, as it receives this information on demand from the navigation service (as provided by the source screen), that is, at a transition time.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and rendering content in general.

Figure 1A:
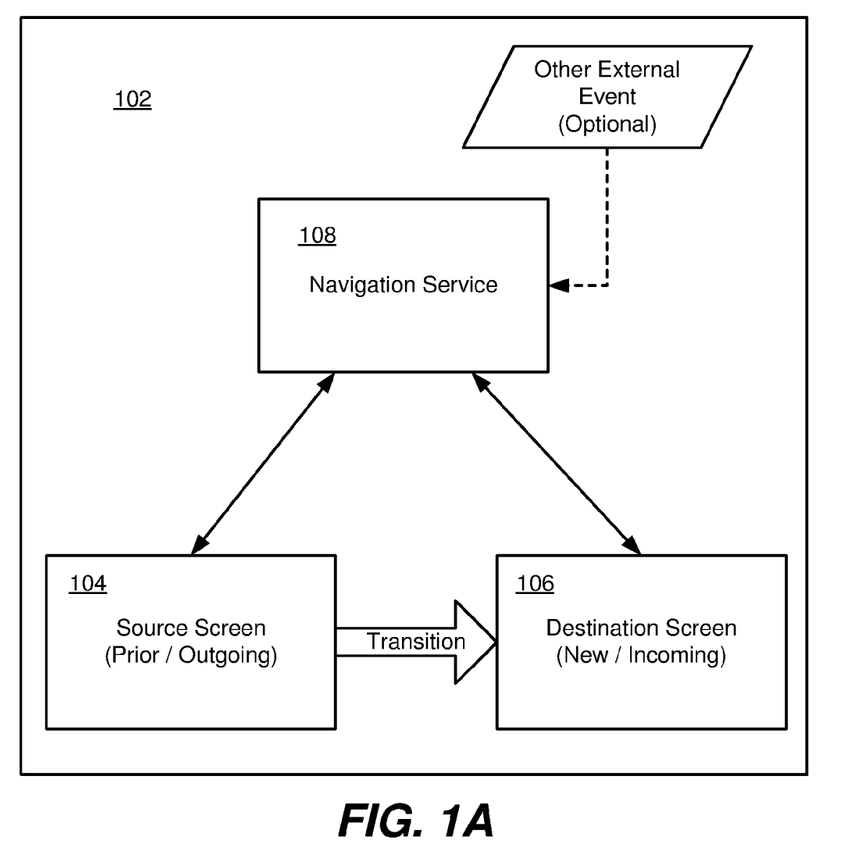
FIG. 1A is a block diagram showing an example configuration that may be used to transition element(s) from a source screen to a destination screen, according to one or more example embodiments.

FIG. 1A shows a block diagram of an example user device 102 (or a system of devices) configured to run any number of programs, e.g., one of which is represented as having a currently active user interface screen. The currently active, outgoing screen may be referred to herein as a source screen 104 because it acts as a source of any retained elements used by the next screen. Note that as used herein, a "screen" refers to any logical unit (such as a view, a page, a menu, a window and so forth) that combines and coordinates one or more UI elements; a screen may refer to what is shown, and/or to the logic/code/controller corresponding to the screen operation. A typical screen may be organized as a UI presentation tree, containing the active on-screen UI elements in a visual hierarchy, each element indexed by a unique name, which may be a reference/identifier (ID) or a human-readable name. Note that a screen may contain inactive and/or hidden elements as well, and each element may contain its own logic along with screen controller logic.

As is known, a user interacts with elements on the source screen 104 via one or more input devices. Theses interactions may cause information to be sent, information to be retrieved, changes to the elements, and so forth. One of the changes may correspond to an event to change to a new screen; such a new, incoming screen may be referred to herein as a destination screen 106. As is understood, the source screen 104 is the source of UI elements (and typically the state of those elements) used by the destination screen 106 whenever possible and desired.

In one implementation described herein, a navigation service 108 is provided to coordinate the transition from the source screen 104 to the destination screen 106. An API set or the like may be used for communication between each screen 104 or 106 and the service 108. As described herein, the transition may include the sharing of any or all element or elements from the source screen 104 to the destination screen 106. Note that FIG. 1A also shows the transition being triggered by an external event, such as generated via a timer, speech recognizer, network signal (e.g., from another device), remote control command, and so forth, rather than more direct user interaction with any UI element on the screen.

Figure 1B:
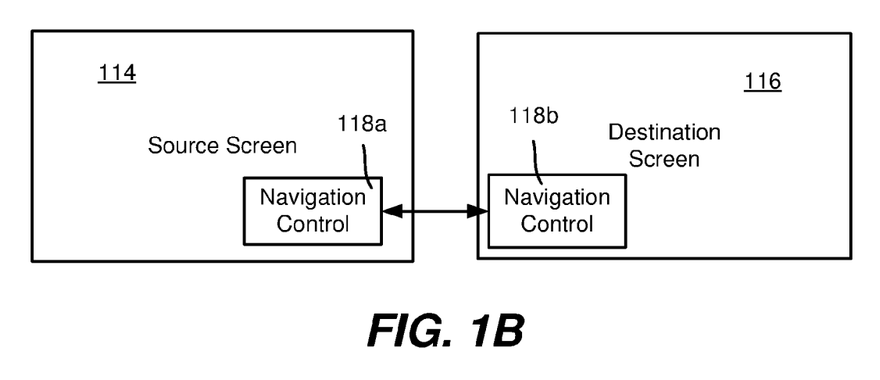
FIG. 1B is a block diagram showing an alternative example configuration that may be used to transition element(s) from a source screen to a destination screen, according to one or more example embodiments.

FIG. 1B shows an alternative model, in which each screen contains a navigation service component (e.g., hidden from the user). In such a model, before closing the source screen 114, navigation controls/elements 118a and 118b on the screens 114 and 116 perform generally the same functionality as a separate navigation service, only more directly instead of indirectly. Thus, as used herein, the term "navigation service" refers to any configuration of one or more components or the like that allows the source screen to exchange information with the destination screen, in at least one direction, including as shown in FIGS. 1A and 1B, even if such a configuration is not ordinarily considered a "service" in other contexts. For purposes of simplicity hereinafter, in general the model of FIG. 1A will be described, e.g., with a single navigation service 108 used by both screens, however it is understood that the manner in which relevant information is exchanged between screens may be varied among alternative embodiments.

Figure 2:
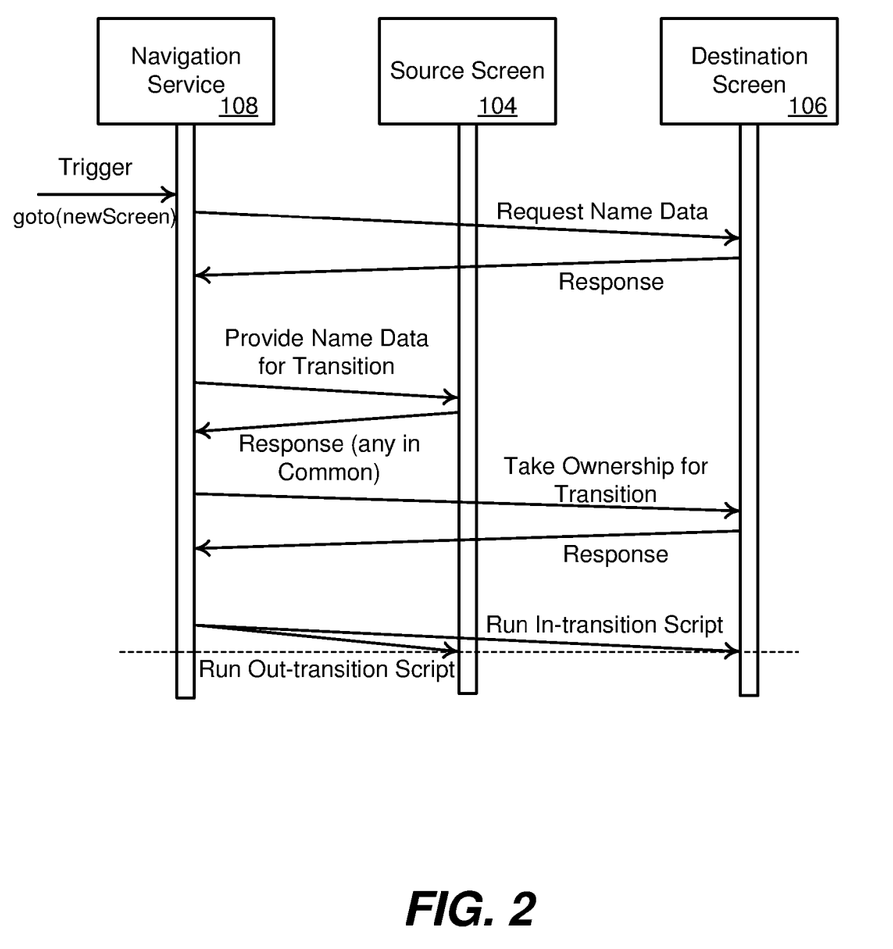
FIG. 2 is a diagram showing generalized timing of how a navigation service may coordinate the transition from a source screen to a destination screen, according to one or more example embodiments.

FIG. 2 represents how the coordination between screens and the service works in one example implementation. In general, some triggering event, whether from a user interaction with the source screen 104 or external event, is detected by the navigation service 108. For example, when a user interacts with the source screen 104 to change to the destination screen 106, the source screen triggers the event to the navigation service 108.

When this occurs, the navigation service 108 communicates with the destination screen 106 (e.g., its control logic) to let the destination screen 106 know to prepare for the transition. As described herein, the transition includes taking over ownership of any shared UI elements that the source screen may have in common with the destination screen. In the example of FIG. 2, the navigation service 108 does such a notification as part of a communication with the destination screen 106 that is also directed to requesting the names of the elements that the destination screen 106 needs to use. The destination screen 106 responds with a list (or other suitable data structure) identifying the names of the desired elements.

The navigation service 108 returns this list to the source screen 104 (e.g., its control logic), which then removes those that it does not have from the list; (instead of removal, the source may flag those it has versus those it does not). The source screen 104 responds with the (possibly) modified list, which now identifies any element or elements that it has in common with what the destination 106 desires. Note however that while the source screen 104 basically removes non-common elements from the list, the source screen 104 does not (ordinarily) remove its own non-needed elements from view synchronously; instead a transition (e.g., animation or other) effect may be used to smoothly (or otherwise) remove the source screen's non-needed elements from view, as exemplified below.

As an alternative to having the source screen process the list, the navigation service may perform the processing. For example, the destination screen may provide its list of desired elements, the source screen may provide its list of available elements, and the navigation service may perform the intersection of the lists. The navigation service may return a list of the elements to the destination that the destination needs to create, and/or may return a list of the elements to the source that the source needs to ignore/keep alive. Alternatively (or in addition to such lists), the navigation service may return the intersection result (which may be an empty set) to the destination, and return a list of any element or elements that need to be torn down to the source screen. As can be readily appreciated, where the various processing steps are performed and/or what protocol is used may vary among alternative embodiments.

As represented in FIG. 2, the navigation service returns the transition-related information, whereby any common element or elements are then used by the destination screen, which includes taking ownership of those element or elements. The retained element or elements typically continue to have their current state data associated therewith, (although the source screen may choose to clear or otherwise modify any element's state data before responding to the navigation service).

When both the source and the destination screens have indicated to the navigation service 108 that the screen transition is ready, including preparing any transition (including any animation) scripts, the navigation service 108 causes the transition scripts to be run in parallel, providing a virtual screen temporarily shared by both screen controllers. In general, an "exit transition" which may include animation effects or the like visibly removes the source screen's not-needed prior elements from the virtual screen, while an "enter transition" animation effect or the like of the destination screen, including any now-owned retained element(s) and any newly created element(s), moves/resizes/fades in/otherwise renders the destination elements. An existing element from the source screen may be left alone as is in terms of position and/or visual appearance.

Figure 3:
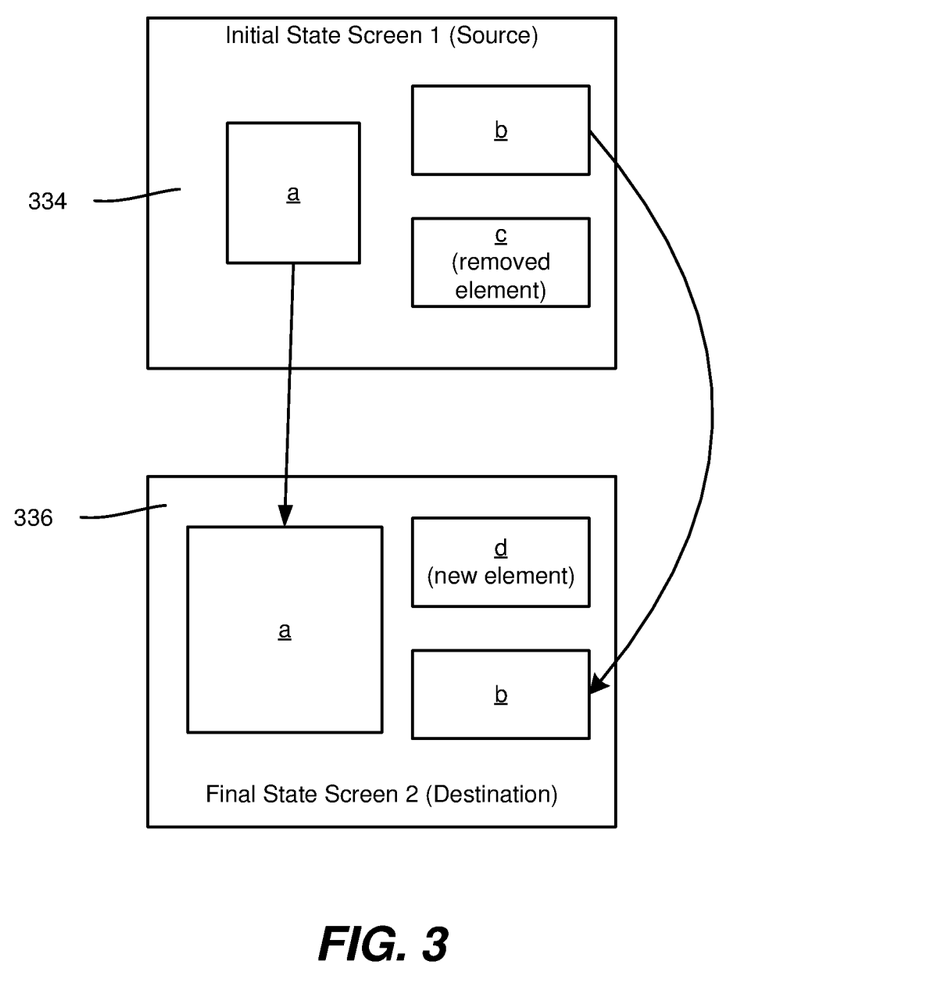
FIG. 3 is a representation of how elements of a source screen may be shared with a destination screen, according to one or more example embodiments.

A general example of a transition is shown in FIG. 3, which shows the state of the UI presentation tree before navigation begins, and after it completes transitioning between screen 334 and screen 336. In FIG. 3, common elements a and b of the source screen 334 are shared to the destination screen 336. Element c is not needed in the destination screen, but element d is, and since not available from the source, is created. Note that from the initial state corresponding to the source screen 334, relative to the final state corresponding to the destination screen 336, the element a is increased in size, while the position of element b is moved down. The element c is removed and the element d is created. At this time, it can be readily appreciated that the "destination" screen now becomes a new source screen for a subsequent destination screen (which actually may be the former source screen via a "back" button or the like). Thus, it is understood that "ownership" of an element may be only temporary.

Figure 4:
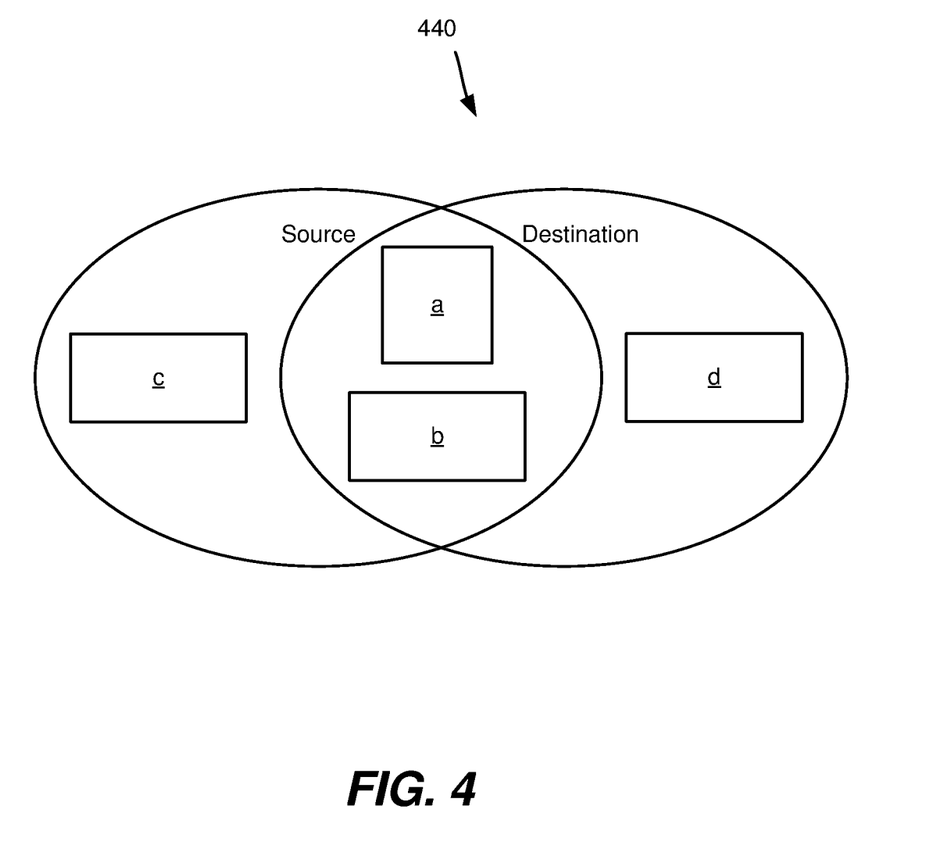
FIG. 4 is a representation of intersecting source screen element-related information with destination screen element-related information to facilitate sharing of elements from the source screen to the destination screen, according to one or more example embodiments.

FIG. 4 shows the intersection/taking of ownership concept in a Venn diagram 440. The destination indicates that it wants to use elements a, b, and d, of which the source had elements a and b (the intersection), whereby the navigation service (or source) has the destination take ownership of the elements a and b. Thus, the source transitions out element c, the destination takes over control of elements a and b, and only element d needs to be created by the destination.

As can be readily appreciated, alternative models may provide for exchanging similar information. For example, the source screen may initially provide a list of its elements (e.g., via the navigation service) to the destination screen, whereby the destination screen may keep those it wants and instruct (e.g., via the navigation service) the source screen to remove the others, or take over and remove others itself. The navigation service may receive a list at transition time, or the list may be provided in advance, in anticipation of a later transition. In one example scenario, starting with the source screen's elements allows the destination screen to take ownership of all existing UI elements from the source screen, even those that the destination screen does not really want, and then transition out as desired those UI elements not wanted, retaining (including animating as desired) those UI elements actually wanted, and creating and transitioning in any new UI elements that are needed. This scenario is more complex from the destination's perspective, but does give the destination complete control over the transition. To reduce complexity, instead of taking over ownership of all elements including one or more not actually needed ones, a destination may take ownership of only some limited number of unneeded ones (e.g., up to three unneeded ones), or only selected unneeded ones, (e.g., only those that are image elements).

Note that a source screen need not share a particular element (and/or its state) with a destination screen. For example, a UI element may contain sensitive data such as a credit card number, and for security purposes a source screen developer may configure the screen to remove any sensitive UI element or elements from the list of requested elements, as if the source screen did not have that element. Note that visible removal of a sensitive-data element may be more immediate rather than smoothly or otherwise animated out. For example, a user may interact to protectively switch to another screen if someone is looking over his or her shoulder at a time when sensitive data is appearing; at such a time, the user does not want such sensitive data to be gradually eliminated from view. Thus, transition effects, if any, may be on an element-by-element basis, and/or based upon whether sensitive data is appearing.

Note that a destination screen may not want a source screen's element, and thus may simply not ask for it even though another instance of the same element is needed. For example, the destination screen may want a particular element cleared of any state data when it first starts, and it may be more efficient and/or visually appealing to simply create a new instance rather than clear and/or reposition/resize an existing element.

FIGS. 5A, 5B, 6A and 6B show how parallel animation of a virtual screen may be used to smoothly transition elements, where the figures correspond to "snapshots" of different states at different times T0, T1, T2 and T3, respectively. Note that the times are not intended to be exactly divided snapshots in time, but rather only approximately convey the concept of parallel animation.

Figure 5A:
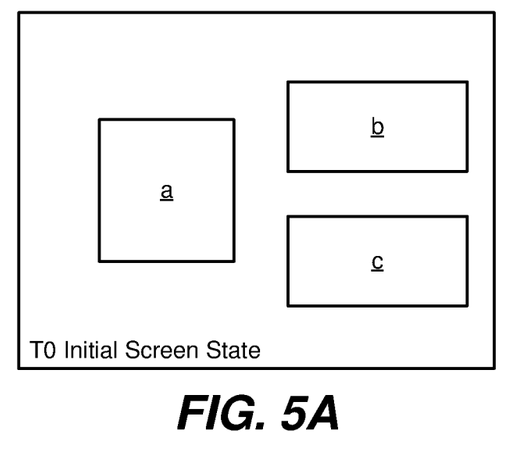
FIGS. 5A, 5B, 6A and 6B comprise representations of screens in time exemplifying animating elements during the transition from a source screen to a destination screen, according to one or more example embodiments.
Figure 5B:
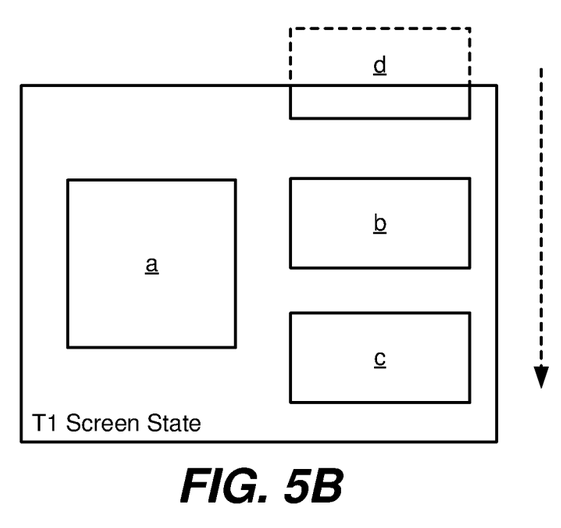

Thus, from an initial state at time T0 (FIG. 5A), FIG. 5B (time T1) shows how a shared element a begins to grow in size, and how element d begins to move into visibility while elements b and c move downward, relative to the element a's size and the positions of element b and c at time T0 (FIG. 5A). Note that once the transition starts, the source screen controller is only in charge of element c at this time, as elements a and b are now owned by the destination screen.

Figure 6A:
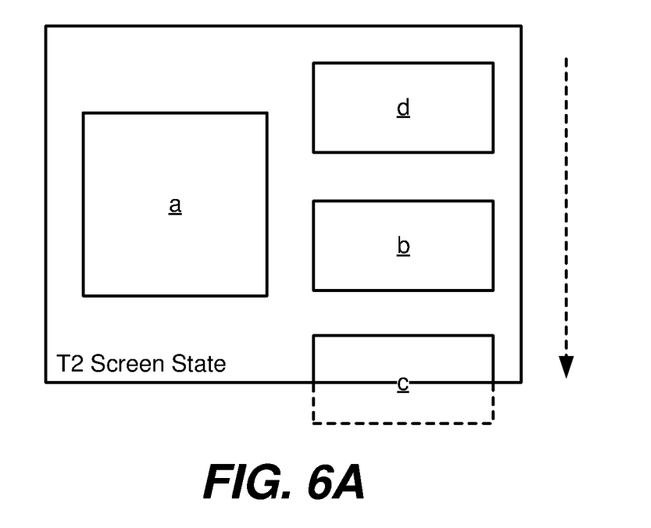
Figure 6B:
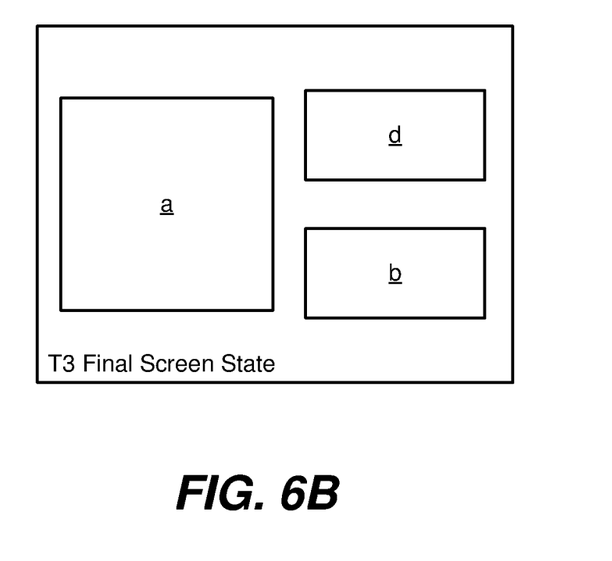

FIG. 6A (time T2) shows a later state, where element c has partially moved off the virtual screen and element d is fully visible on the screen. Note that element a continues to grow in this example. FIG. 6B (time T3) shows the final state.

Note that different alternatives may be used with respect to element interactivity during transition. For example, in a typical scenario, any user interaction may be ignored while the transition effects (e.g., animations) are occurring. Other models may allow the destination screen elements to become active as soon as animation begins (e.g., so that an "impatient" user may click on a button as soon as it starts appearing rather than wait for a slow animation to complete). Hitting a "transitioning-out" prior element such as element c in FIG. 6A example may cause a return to the source screen. Interaction may be on an element-by-element basis, e.g., a "button" element may be interactive during transition/animation but not a textbox element, for example.

It is feasible for transition effect-related data such as animation-related (or other) information to be exchanged between the source and destination screens. For example, instead of relying on screen developers to produce visually coordinated animations, hints or more specific transition effect parameters may be exchanged. For example, in the example of FIGS. 5A-6B, the destination may first suggest to the source to animate any removed elements from the screen (in this case only element d) in a downward direction at a rate of X. As can be readily appreciated, virtually any suitable transition effect/animation information may be exchanged and used, e.g., a rate to fade out (increase transparency of) an element so that a new element appears to fade in over an old element, a start time for moving or accelerating an element's position (e.g., so that another element can move in and "bump" the other element out when it reaches its position (provided to the destination), and so forth.

Figure 7:
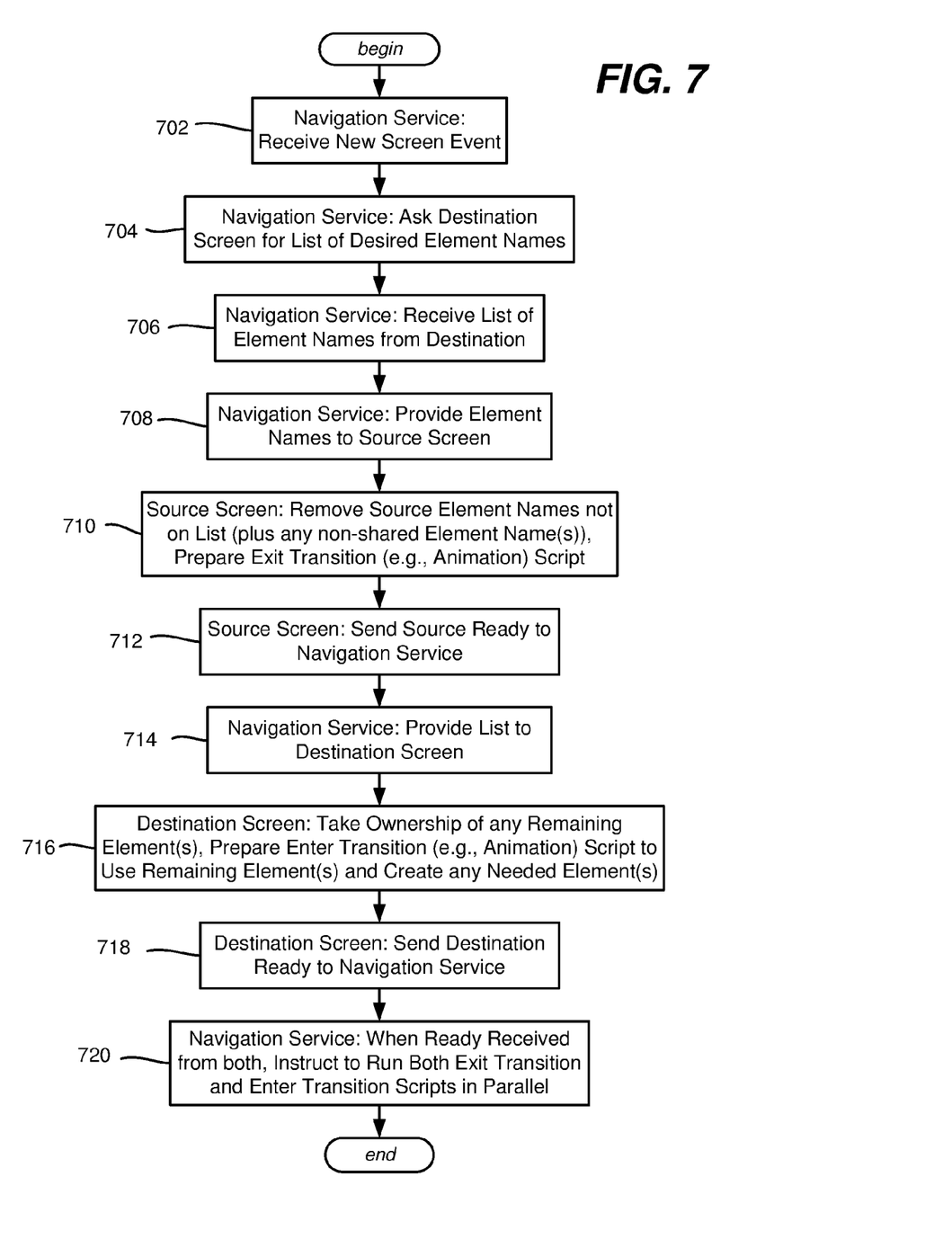
FIG. 7 is a flow diagram showing example steps that may be taken to transition from a source screen to a destination screen, according to one or more example embodiments.

FIG. 7 summarizes some of the operations described herein, including those of the navigation service that drives the view changes, controls the handoff of elements between two screens and coordinates the UI elements that are shared between the two screens. As described above, an actual navigation service is not necessary in all implementations, and it can be readily appreciated the navigation service's steps exemplified in FIG. 7 may be performed by other components, including via the alternative represented in FIG. 1B.

Step 702 represents the navigation service receiving a new screen event, e.g., goTo(newScreen). At step 704, the navigation service asks the destination screen for a list of the desired elements; step 706 represents the navigation service receiving the list of element names desired by the destination. In this example, the list comprises a set of top-level names comprising a collection of UI element indices for the UI elements desired by a screen. Each screen declares a set of such top-level names in one implementation.

At step 708, the list of top-level names is given by the navigation service to the source screen. At step 710, the source screen removes the names from the list that it does not have, and produces an exit transition script or the like that will remove its top level-elements, except for those elements associated with the destination's top level names. The exit script is responsible for destroying any UI elements that are not going to be used by the incoming screen, which typically involves animating out elements that have not been taken over by the destination screen. Step 712 responds to the navigation service with the list, which also indicates that the source is ready to transition out.

At step 714, the navigation service provides the list to the destination screen, which instructs the destination screen to take ownership of any of the elements that remain on the list. Step 716 represents actions taken by the destination screen, including taking ownership and creating any of the remaining elements from its initial list of top level names. In one implementation, step 716 thus results in an enter transition script, e.g., including an animation script or the like that creates any UI elements that do not already exist and animates into place the elements the destination screen owns.

Step 718 represents the response from the destination screen when its enter transition script is ready. At step 720, the navigation service instructs the screens to run both transition scripts, which may comprise animation scripts, in parallel.

Figure 8:
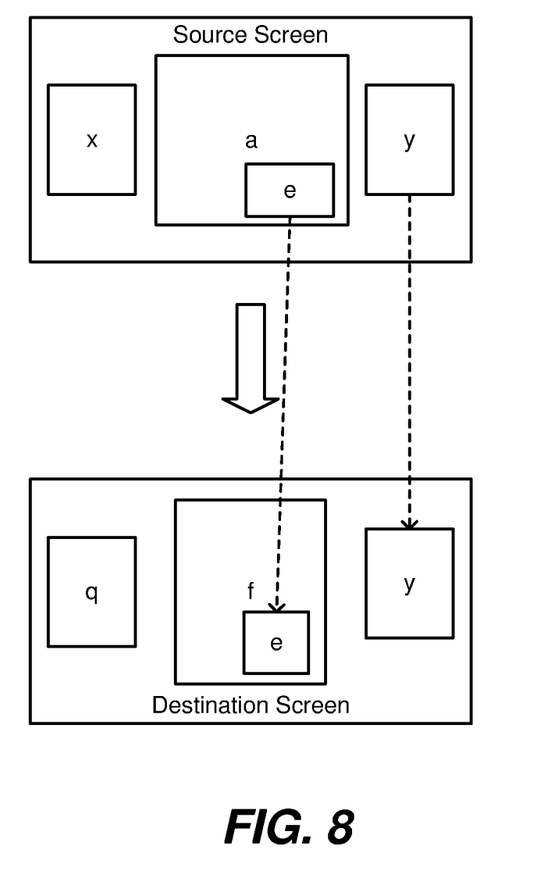
FIGS. 8-10 are representations of transitions of source screens to destination screens, in which top-level and sub-level elements may be shared across screens, according to one or more example embodiments.
Figure 9:
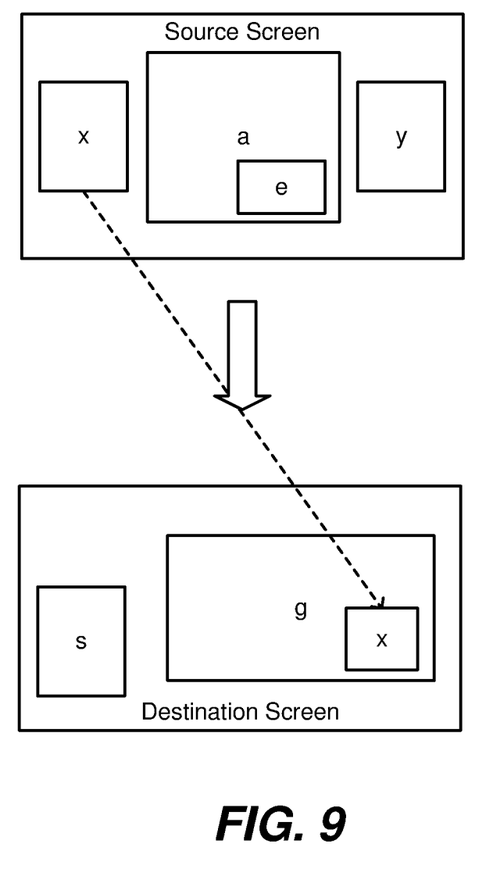
Figure 10:
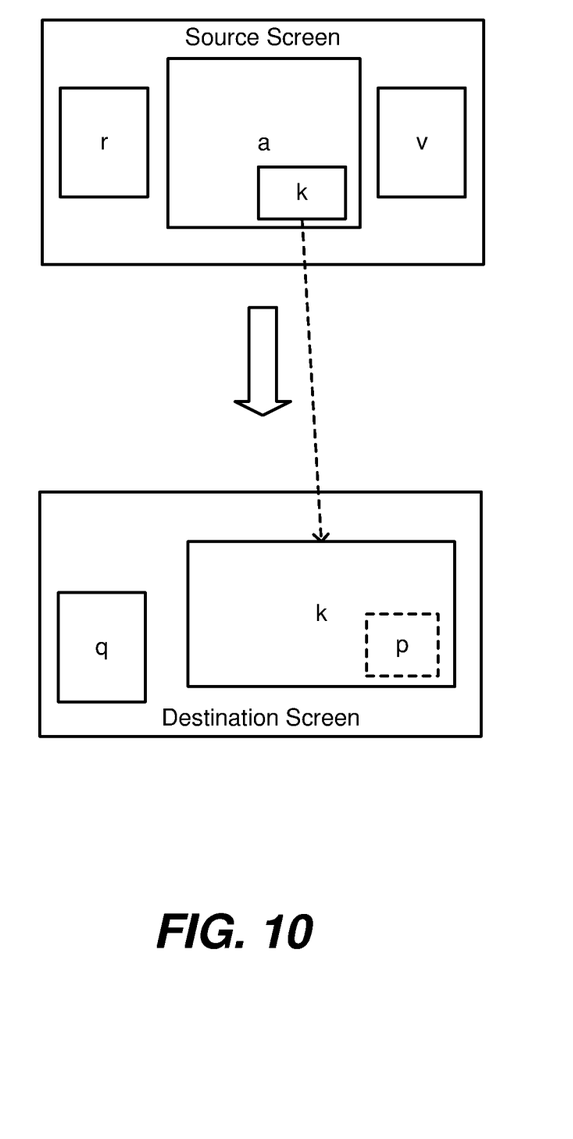

In one or more alternative embodiments, top-level elements may include sub-elements that may be shared across screens. In one or more implementations, sub-level elements may be shared from the source to the destination for use in any of various ways. For example, as exemplified in FIG. 8, a sub-level element e may be shared among top-level elements across screens. In FIG. 9, a top-level element x when in the source screen may become a sub-element of another element g of the destination screen. In FIG. 10, a sub-level element k in the source screen may become a top-level element in the destination screen, which may (or may not) include a sub-element p, and so on. Virtually any top-level element/sub-level hierarchy that is practical and sensible may exist.

Example Computing Device

The techniques described herein can be applied to any device or set of devices capable of running programs and processes, such as the user device 102 of FIG. 1A. It can be understood, therefore, that handheld, portable and other computing devices and computing objects of all kinds including cell phones, tablet/slate computers, gaming/entertainment consoles and the like are contemplated for use in connection with the various embodiments. Accordingly, the below general purpose remote computer described below in FIG. 11 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
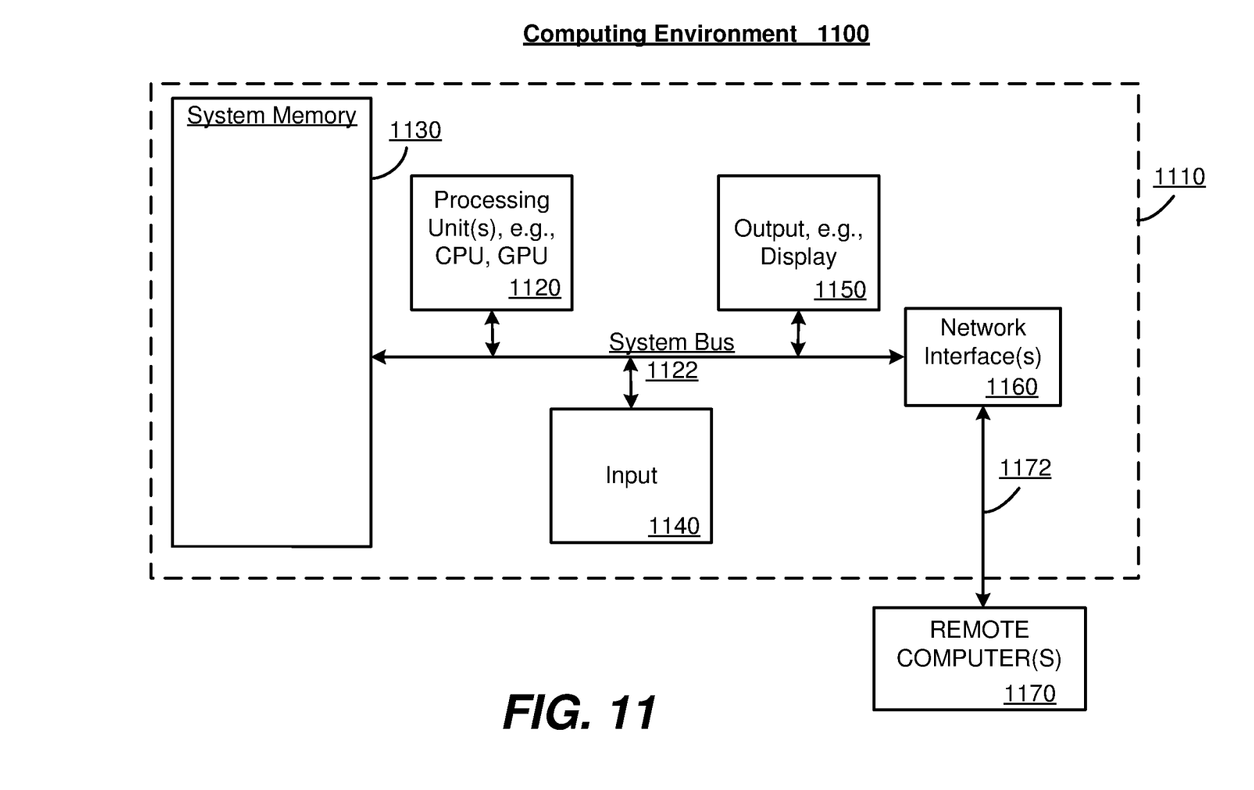
FIG. 11 is a block diagram representing an example computing environment into which aspects of the subject matter described herein may be incorporated.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more embodiments includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine/computer-readable media and can be any available media that can be accessed by computer 1110. The system memory 1130 may include computer storage media in the form of volatile and/or nonvolatile memory such as read only memory (ROM) and/or random access memory (RAM), and hard drive media, optical storage media, flash media, and so forth. By way of example, and not limitation, system memory 1130 may also include an operating system, application programs, other program modules, and program data.

A user can enter commands and information into the computer 1110 through input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method comprising:

exchanging, by a display device comprising a processor, element-related information between source control logic of a source screen corresponding to a first view currently being displayed by the display device and destination control logic of a destination screen corresponding to a second view to be displayed by the display device, wherein the element-related information comprises a first set of elements comprising an intersection of a second set of elements of the source screen and a third set of elements of the destination screen; and transitioning, by the display device from the display of the source screen to a display of the destination screen, comprising using the element-related information at the destination control logic of the destination screen to transition ownership of the third set of elements of the source screen to the destination screen.

2. The method of claim 1, wherein the exchanging the element-related information comprises communicating between the source control logic of the source screen and the destination control logic of the destination screen via a navigation service.

3. The method of claim 1, wherein exchanging the element-related information occurs at a time corresponding to the transitioning.

4. The method of claim 1, wherein the transitioning comprises using a transition-related visual effect on at least one other element that appears between the display of the source screen and the-display of the destination screen.

5. The method of claim 4, further comprising providing transition effect information from the destination control logic to the source control logic related to the transition-related visual effect.

6. The method of claim 1, wherein the transitioning comprises running an exit transition script associated with the source screen that causes a transition-related effect on the display of the source screen.

7. The method of claim 1, wherein the transitioning comprises running an enter transition script associated with the destination screen that causes a transition-related effect on the display of the destination screen.

8. The method of claim 1, wherein the exchanging the element-related information comprises the destination control logic communicating a list of the third set of elements to the source control logic.

9. The method of claim 1, wherein the transitioning comprises creating at least one new element at the destination screen.

10. The method of claim 1, further comprising performing the intersection at a navigation service, at the source control logic, or at the destination control logic.

11. A system comprising:
a memory, and
a processor that is operatively coupled to the memory and which executes code stored in the memory, the processor, in response to execution of the code, being configured to operate as:
a navigation service, the navigation service configured to:
determine element-related information comprising a first set of elements comprising an intersection of a second set of elements of a source screen and a third set of elements of a destination screen;
communicate the element-related information to the destination screen that via destination control logic takes ownership of the first set of elements used by the source screen, and
coordinate a transition from a display of the source screen to a display of the destination screen by a display device.

12. The system of claim 11, wherein the element-related information comprises one or more names, references, or other identifying information corresponding to one or more elements of the first set.

13. The system of claim 11, wherein the element-related information contains at least one sub-level name, reference, or other identifying information corresponding to one or more elements of the first set.

14. The system of claim 11, wherein the navigation service is configured to coordinate the transition based upon an exit transition script associated with the source screen that runs in parallel or substantially in parallel with an enter transition script associated with the destination screen.

15. The system of claim 14, wherein the exit transition script of the source screen includes at least one of an animation or other transition visual effect that transitions out at least one element of the source screen.

16. The system of claim 14, wherein the enter transition script of the destination screen includes at least one of an animation or other transition visual effect that transitions in at least one element of the destination screen.

17. The system of claim 14, wherein the enter transition script of the destination screen creates at least one new element of the destination screen.

18. A non-transitory computer-readable medium having instructions stored thereon that, in response to execution, cause a system including a processor to perform operations comprising:
transitioning a user interface from a source screen to a destination screen, comprising,
determining element-related information comprising a first set of elements comprising an intersection of a second set of elements of a source screen and a third set of elements of a destination screen;
coordinating the changing of ownership of the first set of elements from the source screen to the destination screen, in which control logic of the destination screen does not know in advance of the first set of elements, and
the control logic of the destination screen creating a new user interface element associated with the destination screen to produce the destination screen state comprising at least a representation of the first set of elements and a representation of the new user interface element.

19. The non-transitory computer-readable medium of claim 18, the operations further comprising the control logic communicating a list of the third set of elements to the source control logic of the source screen.

20. The non-transitory computer-readable medium of claim 18, wherein the transitioning the user interface from the source screen to the destination screen includes running at least one transition script that modifies at lease one of an appearance or position of an element of the first set in the destination screen relative to the at lease one of the appearance or position of the element of the first set in the source screen.

* * * * *